United States Patent [19]

Hensley, Jr. et al.

[11] 3,893,908

[45] July 8, 1975

[54] REFORMING WITH CATALYSTS CONTAINING A GROUP VIA METAL COMPONENT AND TECHNETIUM AS A PROMOTER

[75] Inventors: Albert L. Hensley, Jr., Munster; Thomas D. Nevitt, Valparaiso, both of Ind.

[73] Assignee: Standard Oil Company, Chicago, Ill.

[22] Filed: Mar. 15, 1974

[21] Appl. No.: 451,357

Related U.S. Application Data

[60] Division of Ser. No. 285,302, Aug. 31, 1972, which is a continuation of Ser. No. 127,808, March 24, 1971, abandoned.

[52] U.S. Cl.................................. 208/136; 252/465
[51] Int. Cl.............................................. C10g 35/06
[58] Field of Search.......... 208/136, 135; 260/673.5; 252/465

[56] References Cited
UNITED STATES PATENTS

| | | | |
|---|---|---|---|
| 2,772,217 | 11/1956 | Nicholson | 208/136 |
| 2,916,439 | 12/1959 | Schricker, Jr. | 208/136 |
| 3,114,697 | 12/1963 | Bourne | 252/465 |
| 3,179,602 | 4/1965 | Gromillion | 252/465 |
| 3,383,306 | 5/1968 | Rogers et al. | 252/465 |
| 3,574,092 | 4/1971 | Mitsche | 208/139 |
| 3,663,426 | 5/1972 | Mikovsky et al. | 208/135 |

OTHER PUBLICATIONS
Blackham et al., "Nuclear Science Abstracts," Apr. 30, 1970, p. 1367, Abstract of Technetium as a Catalyst in Organic Reactions, June 15, 1968.

*Primary Examiner*—Delbert E. Gantz
*Assistant Examiner*—Juanita M. Nelson
*Attorney, Agent, or Firm*—James L. Wilson; Arthur G. Gilkes; William T. McClain

[57] ABSTRACT

There is provided a process for the reforming of a petroleum hydrocarbon stream, which process comprises contacting said hydrocarbon stream in a reforming zone under suitable reforming conditions and in the presence of hydrogen with a catalyst comprising a component having hydrogenation-dehydrogenation activity and dehydrocyclization activity, a suitable support, and as a promoter a small amount of technetium. The support may comprise alumina and the component having hydrogenation-dehydrogenation activity and dehydrocyclization activity may be a member selected from the group consisting of one or more metals of Group VIA, compounds of one or more metals of Group VIA, and combinations thereof. The preferred Group VIA metal is chromium. The catalyst may comprise also a second member selected from the group consisting of an oxide of an alkali metal, an oxide of alkaline earth metal, and mixtures thereof.

12 Claims, No Drawings

{ 3,893,908 }

REFORMING WITH CATALYSTS CONTAINING A GROUP VI A METAL COMPONENT AND TECHNETIUM AS A PROMOTER

CROSS-REFERENCE TO RELATED APPLICATIONS

This application is a Divisional Application of copending application U.S. Ser. No. 285,302, filed on Aug. 31, 1972, which is a Continuation Application of U.S. Ser. No. 127,808, which was filed on Mar. 24, 1971, and is now abandoned.

BACKGROUND OF THE INVENTION

One of the important petroleum refining processes that are employed to provide high-octane-number hydrocarbon blending components for gasoline is the reforming process. In the typical reforming process, aromatics are produced by means of (1) the dehydrogenation of six-carbon-member-ring naphthenes, (2) the isomerization of five-carbon-member-ring naphthenes to six-carbon-member-ring naphthenes, and the subsequent dehydrogenation of the six-carbon-member-ring naphthenes, and (3) the dehydrocyclization of paraffinic hydrocarbons to aromatics.

Petroleum naphthas and gasoline-boiling range hydrocarbons are converted in the typical reforming process in the presence of various catalysts. Typical of these catalysts are chromium-oxides-on-alumina catalysts, molybdenum-oxides-on-alumina catalysts and platinum-on-alumina catalysts. The platinum-on-alumina catalysts may contain also aluminosilicate materials and/or a halide. In the past, the catalysts that have been most frequently employed in the reforming process by the petroleum refining industry have been the platinum-containing catalysts.

There has now been found an improved catalytic composition for the reforming of petroleum hydrocarbon streams to produce much higher octane number products. The catalyst, when employed in the reforming of petroleum hydrocarbons, provides high activity and selectivity and contains as a promoter a small amount of technetium.

SUMMARY OF THE INVENTION

Broadly, according to the present invention, there is provided a catalytic composition for the reforming of petroleum hydrocarbon streams, which catalytic composition comprises a component having hydrogenation-dehydrogenation activity and dehydrocyclization activity, a suitable support, and as a promoter a small amount of technetium. This small amount of technetium may be present in an amount of about 0.01 to about 2 weight percent, based on the weight of the catalytic composition. The component having hydrogenation-dehydrogenation activity and dehydrocyclization activity is a member selected from the group consisting of one or more metals of Group VIA, compounds of one or more metals of Group VIA, and combinations thereof. A preferred Group VIA metal is chromium. When the catalyst contains oxides of chromium, it may contain also a member selected from the group consisting of the oxide of an alkali metal, an oxide of an alkaline earth metal, and mixtures thereof. A preferred suitable support comprises a catalytically active alumina.

According to the present invention there is provided an improved process for reforming a petroleum hydrocarbon stream to obtain a product having a high-octane number, which process comprises contacting said hydrocarbon stream in a reforming zone under suitable reforming conditions and in the presence of hydrogen with an embodiment of the catalytic composition of the present invention.

DESCRIPTION AND PREFERRED EMBODIMENTS

The highly mechanized society of today requires an increasing demand for motor fuels having very-high-octane numbers. One of the sources of such high octane numbers comprises aromatics resulting from the reforming of petroleum hydrocarbon fractions. Such aromatics can be obtained by both the dehydrogenation of the naphthenes in the petroleum hydrocarbon fractions and the dehydrocyclization of paraffins. There has now been found an improved catalytic composition for the reforming of petroleum hydrocarbon streams. This catalytic composition comprises a component having hydrogenation-dehydrogenation activity, a suitable support, and a small amount of technetium as a promoter.

The component having the hydrogenation-dehydrogenation activity and dehydrocyclization activity comprises a member selected from the group consisting of one or more metals of Group VIA of the Periodic Table of Elements, compounds of one or more metals of Group VIA, and combinations thereof. The Periodic Table of Elements considered herein is found on page 2 of MODERN ASPECTS OF INORGANIC CHEMISTRY, written by H. J. Emeleus and J. S. Anderson and published by D. Van Nostrand Company, Inc., New York, New York (1949). Molybdenum and chromium are metals of Group VIA of the Periodic Table of Elements that may be employed in the catalytic composition of the present invention. Chromium is the preferred Group VIA metal and may be present in an amount within the range of about 5 to about 25 weight percent, calculated as $Cr_2O_3$ and based on the weight of the catalyst.

Suitable supports that may be employed in the catalytic composition of the present invention are catalytically active alumina, acid-treated aluminas, silica-stabilized alumina containing up to 15 weight percent silica, and composites of catalytically active alumina and the oxides of titanium and/or zirconium.

Excellent support material for the catalytic composition of the present invention is a catalytically active alumina. It is preferred that the catalytically active alumina have a large pore diameter. Such largepore-diameter aluminas should possess a surface area of about 100 to about 800 meters per gram. The average pore diameter should be within the range of about 70 to about 200 Angstrom units (A), suitably within the range of about 125 to about 180 A, and preferably within the range of about 135 to about 160 A. The surface area of such large-pore-diameter aluminas will fall advantageously within the range of about 150 to about 500 square meters per gram, suitably within the range of about 200 to about 300 square meters per gram.

Suitable aluminas can be purchased from manufacturers of catalysts. For example, NALCO 471 aluminas are available from the Nalco Chemical Company. These aluminas can be obtained with pore volumes from as low as 0.54 cubic centimeters per gram to as high as 2.36 cubic centimeters per gram and average pore diameters within the range of about 72 to about 305 A. Therefore, those NALCO 471 aluminas which have the desired physical properties are suitable for use as the support of the catalytic composition of the present invention. In addition, suitable aluminas can be obtained from the American Cyanamid Company. For example, a typical sample of American Cyanamid's Aero–100 extrudate was found to have an average pore diameter of 138 A and a surface area of 178 square meters per gram. While the preferred aluminas are the large-pore-diameter aluminas, aluminas having pore diameters that are less than 70 A may be used in the catalytic composition of the present invention.

The catalyst may be prepared in several ways. For example, the catalyst can be made by impregnating the catalytically active alumina with an aqueous solution of either chromium nitrate, ammonium chromate, chromic acid, or ammonium dichromate. The chromium-containing alumina support can then be impregnated with a suitable aqueous solution of a technetium compound. On the other hand, the catalyst can be prepared through the formation of a chromia-alumina aerogel. Ethylene oxide is added to a solution of aluminum chloride, chromic chloride, and glycerol. The catalyst may also be prepared by impregnating alumina with an aqueous solution of chromium nitrate. Moreover, the catalyst may be prepared by co-precipitation employing solutions of chromium acetate and sodium aluminate. The alkaline promoter compound or element, if one is to be employed, may be added prior to co-gelling or co-precipitation of the chromia and the alumina. The technetium may be introduced into the catalyst composite by impregnating the alumina together with other components with a solution of a suitable technetium compound, such as $(NH_4)_2TcO_4$. After impregnation, the catalyst composite may be dried and calcined.

Suitable drying conditions for use in the various catalyst manufacturing methods include a temperature in the range of 200° to about 400°F. for a period of time of about 5 to about 30 hours. Suitable calcination conditions include a temperature of about 900° to about 1,500°F. for a time of about 2 to about 20 hours. Preferred drying and calcining conditions are a temperature of about 250°F. for about 16 hours and a temperature of about 1,000°F. for about 6 hours, respectively.

The methods of catalyst preparation that are described hereinabove are not the only ways of preparing the catalytic composition of the present invention and, therefore, this summary of preparation methods is not intended to exclude other methods which are not described herein.

If the catalytic composition of the present invention contains as the component having hydrogenation-dehydrogenation activity and dehydrocyclization activity the oxides of chromium, the catalyst may also contain a member selected from the group consisting of an oxide of an alkali metal, an oxide of an alkaline earth metal, and mixtures thereof. Such a member may be present in an amount of about 0.1 to about 5 weight percent, calculated as the oxide and based on the weight of the catalytic composition.

The catalytic composition of the present invention may be used in a process for the reforming of petroleum hydrocarbon streams. Therefore, according to the present invention, there is provided a process for reforming a petroleum hydrocarbon feedstock to obtain products that have very-high-octane numbers and that can be used as blending components for gasoline.

The new process can be carried out in any of the conventional types of equipment known to the art. One may, for example, employ catalysts in the form of pills, pellets, granules, broken fragments, or various special shapes, disposed as a fixed bed within a reaction zone, and the charging stock may be passed therethrough in the vapor phase, and in either upward or downward flow. Alternatively, the catalysts may be in a suitable form for use in moving beds, in which the charging stock and the catalyst are preferably passed in countercurrent flow; or in fluidized-solid processes, in which the charging stock is passed upward through a turbulent bed of finely-divided catalyst; or in the suspensoid process, in which the catalyst is slurried in the charging stock and the resulting mixture is conveyed into the reaction zone. The preferred fixed-bed process is exemplified by Ultraforming (PETROLEUM ENGINEER, Vol. XXVI, No. 4, April 1954, at page C–35). The reaction products from any of the foregoing processes are separated from the catalyst and fractionated to recover the various components thereof. The hydrogen and unconverted materials are recycled as desired; the excess hydrogen that is produced in the reformer conveniently being utilized in the hydrodesulfurization of the feed, if such desulfurization is required.

The improved process of this invention may be used to reform a feedstock which is a member selected from the group consisting of a virgin naphtha, a cracked naphtha, a hydrocarbon fraction boiling in the gasoline boiling range, mildly-reformed naphthas, and mixtures thereof. A naphtha will exhibit a boiling range of about 70° to about 500°F., preferably, about 180° to about 400°F. The gasoline boiling range comprises temperatures of about 120° to about 420°F., preferably about 140° to about 380°F.

Desirable feedstocks may contain substantial amounts of paraffins. In fact, such feedstock may contain paraffins in the amount of about 5 to about 100 volume percent. It is suggested that where naphthenes are present in the petroleum hydrocarbon stream to be reformed, the ratio of paraffins to five-carbon-member-ring naphthenes should be at least 6-to-1, when employing the chromia-containing catalysts.

Suitable reforming conditions are employed in the process of the present invention. Suitable operating conditions comprise an average catalyst bed temperature of about 900° to about 1,050°F., a total pressure of about 0 psig to about 100 psig, a hydrogen-to-hydrocarbon ratio of about 500 to about 10,000 SCFB, and a LHSV of about 0.1 to about 5 volumes of hydrocarbon per hour per volume of catalyst. Preferred operating conditions that may be employed with such an embodiment of the catalytic composition comprise an average catalyst bed temperature of about 920° to about 1,000°F., a total pressure of about 20 to about 45 psig, a hydrogen-to-hydrocarbon ratio of about 1,000 to about 5,000 SCFB, and a LHSV of about 0.2 to about 5 volumes of hydrocarbon per hour per volume of catalyst.

Unwanted products in the reforming of petroleum hydrocarbon streams are light hydrocarbon gases and coke. Compounds, such as polynuclear aromatics, result in coke. As the operation progresses, a substantial amount of coke accumulates on the surface of the catalyst, resulting in an increasingly rapid rate of catalyst deactivation. Consequently, the coke must be removed from the surface. Such coke removal may be accomplished through a coke-burn treatment wherein the coke-containing catalyst is contacted with an oxygen-containing gas at selected temperatures. Typically, the gas will contain oxygen within the range of about 1 volume percent to about 21 volume percent. The concentration of oxygen in the gas should be maintained at a level which will not result in the production of temperatures that are in excess of 1,100°F., preferably, in excess of 1,050°F. The catalytic composition of the present invention is capable of withstanding the conditions employed in the regeneration and is capable of being regenerated.

The following examples are presented for the purpose of illustration only and are not intended to limit the scope of the present invention.

EXAMPLE I

A catalyst containing technetium on a catalytically active alumina was prepared. The alumina was a commercially-prepared gamma-alumina having a very high purity. It was manufactured by the American Cyanamid Company. A 25-gram portion of the alumina was ground to pass through a 14-mesh screen (U.S. Sieve Series), but to be retained on a 20-mesh screen (U.S. Sieve Series). This pulverized alumina was impregnated with 40 ml. of a solution that contained 0.30 gram of $(NH_4)_2TcO_4$. The impregnated material was dried in static air at ambient temperature and was calcined subsequently for 1 hour in static air at a temperature of 842°F. (450°C.). This catalyst, identified hereinafter as Catalyst A, was prepared to contain 0.6 weight percent technetium.

Catalyst A was employed to convert an ASTM-grade n-heptane obtained from the Phillips Petroleum Company. This feedstock contained 0.88 weight percent methylhexanes and 0.86 weight percent methylcyclohexane.

The test was conducted in a fully-automated bench-scale test unit. The reactor had an inside diameter of ⅝ inch and was 22 inches in length. A ⅛-inch co-axial thermowell extended up through the reactor from the bottom of the reactor. A 6.5-inch catalyst bed was formed in the annular space between the reactor wall and the thermowell. A 10-cc. sample of catalyst was employed. Conventional small-scale product-recovery equipment was employed. Gas-chromatographic methods were used to analyze the total product collected over the specified period of time. This unit was also employed in the tests discussed in the example presented hereinafter.

In this test, the normal-heptane feedstock was passed over Catalyst A at a LHSV of 1.0 volume of hydrocarbon per hour per volume of catalyst. The average catalyst bed temperature was 920°F. The product sample obtained for analytical purposes was accumulated over a period of time extending from the second hour of the test to the 17th hour. It was found that 35.1 percent conversion was obtained during this test, the normal-heptane having been converted to 23.1 percent toluene and 12 percent cracked products.

These data demonstrate that a technetium-on-alumina catalyst does provide some reforming capability, but these data do not suggest that such a catalyst is a superior reforming catalyst.

EXAMPLE II

An alkalized chromium-oxide-on-alumina catalyst was prepared. A 900-gram portion of large-pore-diameter Aero-100 alumina, manufactured by the American Cyanamid Company, was impregnated with a one-liter solution which contained 165.0 grams of $(NH_4)_2Cr_2O_7$ and 15.0 grams of $K_2CO_3$ dissolved in distilled water. The impregnated material was dried in static air for 24 hours at ambient temperature and then calcined in static air for 2 hours at a temperature of 752°F. (400°C.). This catalyst, identified hereinafter as Catalyst B, was prepared to contain 1.0 weight percent $K_2O$ and 9.8 weight percent $Cr_2O_3$ on catalytically active alumina. It was ground to pass through a 14-mesh screen (U.S. Sieve Series), but to be retained on a 35-mesh screen (U.S. Sieve Series).

A 50-gram portion of the air-dried Catalyst B was ground to pass through a 16-mesh screen (U.S. Sieve Series), but to be retained on a 35-mesh screen (U.S. Sieve Series). The pulverized material was impregnated with 25 ml. of a solution that contained 0.2 gram of $(NH_4)_2TcO_4$. The impregnated material was dried in static air at ambient temperature and was calcined subsequently for 2 hours in static air at a temperature of 752°F. (400°C). This catalyst, identified hereinafter as Catalyst C, was prepared to contain 0.2 weight percent technetium.

Each catalyst was tested for its ability to convert mildy-reformed naphthas. These feedstocks, identified hereinafter as Feedstock A and Feedstock B, have the properties shown in Table I.

TABLE I

| FEEDSTOCK PROPERTIES | | |
|---|---|---|
| Feedstock | A | B |
| Gravity, °A.P.I. | 49.1 | |
| ASTM Distillation, °F. | | |
| IBP | | |
| 5% | 75 | 76 |
| 10 | | |
| 30 | | |
| 50 | | |
| 70 | | |
| 90 | | |
| 95 | 408 | 396 |
| EBP | | |
| Unleaded Research Octane No. | 73.4 | |
| Type Analysis, Vol.% | | |
| Paraffins | 47.3 | |
| Napthenes | 11.4 | 52.0 |
| Aromatics | 41.3 | 48.0 |

The operating conditions, as well as pertinent test data, are presented in Table II hereinbelow. Each of the catalysts was regenerated twice. Regeneration was performed at essentially atmospheric pressure. The test system was first purged with bottled nitrogen for about 30 minutes at a nitrogen flow rate of about 1 cubic foot per hour. Then a slow flow of air was introduced into the reactor at a temperature of 900°F. in such an amount that the maximum temperature at any point in the catalyst bed did not exceed 1,000°F. After the resultant "flame-front" had passed through the entire catalyst bed, the bed was purged with bottled nitrogen for a period of about 30 minutes at a flow rate of 1 cubic foot per hour and the average catalyst bed temperature was brought down to a temperature of about 850°F. The unit was then pressured with bottled hydrogen to a pressure of 60 psig and hydrogen flow was permitted to line out at a flow rate of about 0.2 standard cubic foot per hour. The catalyst was again tested with the designated feedstock at the conditions shown in Table II. Also presented in Table II are the results of the test.

TABLE II

TEST DATA

| Test No. | 4 | 4 | 5 | 5 | 5 |
|---|---|---|---|---|---|
| Catalyst | B | B** | C | C* | C** |
| Feedstock | A | B | A | A | B |
| Products-Composite: | | | | | |
| Initial hour | 4 | 1 | 2 | 2 | 2 |
| Final hour | 21 | 15 | 17 | 19 | 19 |
| Pressure, psig | 30 | 30 | 60 | 60 | 60 |
| Inlet Temp., °F. | | | | | |
| Average Catalyst Bed Temp., °F. | 974 | 984 | 966 | 974 | 977 |
| LHSV | 0.5 | 0.5 | 1.0 | 0.5 | 0.5 |
| Hydrogen added, SCFB | 2,000 | 2,000 | 2,000 | 2,000 | 2,000 |
| Aromatics, vol.% | 51.3 | 56.2 | 52.3 | 55.1 | 58.1 |
| $C_{5+}$ yield, vol.% | 82.0 | 81.2 | 84.9 | 80.7 | 80.5 |
| Coke, wt.% on feed | 0.36 | 0.35 | 0.10 | 0.15 | 0.21 |

*REGENERATED ONE TIME
**REGENERATED TWO TIMES

The results presented in Table II indicate that the technetium-promoted, alkalized chromium-oxides-on-alumina catalyst, Catalyst C, provided a higher concentration of aromatics in the product at a slightly lower average catalyst bed temperature with at least comparable $C_{5+}$ yields. Moreover, the data show that a coke reduction was obtained with the catalyst containing technetium. The data also demonstrate the regenerability of the catalyst.

What is claimed is:

1. A process for the reforming of a petroleum hydrocarbon stream which is a member selected from the group consisting of a virgin Naphtha, a cracked Naphtha, a hydrocarbon fraction boiling in the gasoline boiling range, mildly - reformed Naphthas and mixture thereof, which process comprises contacting said hydrocarbon stream in a reforming zone under suitable reforming conditions and in the presence of hydrogen with a catalytic composition comprising a component having hydrogenation-dehydrogenation activity and dehydrocyclization activity comprising the oxides of chromium, a suitable support comprising a catalytically active alumina, and as a promoter a small amount of technetium.

2. The process of claim 1 wherein said small amount of technetium of said catalytic composition is within the range of about 0.01 weight percent to about 2 weight percent, based on the total weight of said catalytic composition.

3. The process of claim 1 wherein said reforming conditions comprise an average catalyst bed temperature of about 900°F. to about 1,050°F., a total pressure of about 0 psig to about 100 psig, a hydrogen-to-hydrocarbon ratio of about 500 SCFB to about 10,000 SCFB, and a LHSV of about 0.1 to about 5 volumes of hydrocarbon per hour per volume of catalyst.

4. The process of claim 1 wherein said catalytic composition comprises also a second member selected from the group consisting of an oxide of an alkali metal, an oxide of an alkaline earth metal, and mixtures thereof.

5. The process of claim 2 wherein said catalytic composition comprises also a second member selected from the group consisting of an oxide of an alkali metal, an oxide of an alkaline earth metal, and mixtures thereof, said second member being present in an amount within the range of about 0.1 weight percent to about 5 weight percent, calculated as the oxide and based on the weight of said catalytic composition.

6. The process of claim 2 wherein said oxides of chromium of said catalytic composition are present in an amount within the range of about 5 weight percent to about 25 weight percent, calculated as $Cr_2O_3$ and based on the weight of said catalytic composition.

7. The process of claim 1 wherein said catalytic composition comprises also a second member selected from the group consisting of an oxide of an alkali metal, an oxide of an alkaline earth metal, and mixtures thereof.

8. The process of claim 5 wherein said reforming conditions comprise an average catalyst bed temperature of about 900°F. to about 1,050°F., a total pressure of about 0 psig to about 100 psig, a hydrogen-to-hydrocarbon ratio of about 500 SCFB to about 10,000 SCFB, and a LHSV of about 0.1 to about 5 volumes of hydrocarbon per hour per volume of catalyst.

9. The process of claim 6 wherein said catalytic composition comprises also a second member selected from the group consisting of an oxide of an alkali metal, ano oxide of an alkaline earth metal, and mixtures thereof, said second member being present in an amount within the range of about 0.1 weight percent to about 5 weight percent, calculated as the oxide and based on the weight of said catalytic composition.

10. The process of claim 6 wherein said reforming conditions comprise an average catalyst bed temperature of about 900°F. to about 1,050°F., a total pressure of about 0 psig to about 100 psig, a hydrogen-to-hydrocarbon ratio of about 500 SCFB to about 10,000 SCFB, and a LHSV of about 0.1 to about 5 volumes of hydrocarbon per hour per volume of catalyst.

11. The process of claim 7 wherein said reforming conditions comprise an average catalyst bed temperature of about 900°F. to about 1,050°F., a total pressure of about 0 psig to about 100 psig, a hydrogen-to-hydrocarbon ratio of about 500 SCFB to about 10,000 SCFB, and a LHSV of about 0.1 to about 5 volumes of hydrocarbon per hour per volume of catalyst.

12. The process of claim 9 wherein said reforming conditions comprise an average catalyst bed temperature of about 900°F. to about 1,050°F., a total pressure of about 0 psig to about 100 psig, a hydrogen-to-hydrocarbon ratio of about 500 SCFB to about 10,000 SCFB, and a LHSV of about 0.1 to about 5 volumes of hydrocarbon per hour per volume of catalyst.

* * * * *

UNITED STATES PATENT OFFICE
CERTIFICATE OF CORRECTION

Patent No. 3,893,908    Dated July 8, 1975

Inventor(s) Albert L. Hensley, Jr. et al.

It is certified that error appears in the above-identified patent and that said Letters Patent are hereby corrected as shown below:

Column 2, line 50, "largepore-" should read -- large-pore- --.

Column 2, line 52, "800 meters" should read -- 800 square meters --.

Signed and Sealed this

Third Day of August 1976

[SEAL]

Attest:

RUTH C. MASON
Attesting Officer

C. MARSHALL DANN
Commissioner of Patents and Trademarks